May 28, 1957   E. O. GANSLEIN   2,793,972
METHOD OF MAKING METAL-FACED LAMINATES
Filed May 24, 1954   2 Sheets-Sheet 1

INVENTOR.
Edward O. Ganslein
BY
*ATTORNEY*

May 28, 1957 E. O. GANSLEIN 2,793,972
METHOD OF MAKING METAL-FACED LAMINATES
Filed May 24, 1954 2 Sheets-Sheet 2

INVENTOR.
Edward O. Ganslein
BY
ATTORNEY

2,793,972
Patented May 28, 1957

2,793,972

METHOD OF MAKING METAL-FACED LAMINATES

Edward O. Ganslein, Alliance, Ohio, assignor to Goodyear Aircraft Corporation, Akron, Ohio, a corporation of Delaware Application May 24, 1954, Serial No. 431,840

2 Claims. (Cl. 154—118)

This invention relates to the construction of laminated panels consisting of metal face sheets and of a honeycomb core therebetween made of any suitable material or of balsa wood or other low density material cemented to the face sheets and, in particular, to improvement of the adhesion between two layers of sheet metal as, for instance, when locally reinforcing the face sheets of the panel.

Since especially in the aircraft industry there is the tendency for greater use of metal-faced laminates for walls, floorings, and other structural parts, the improvement of the adhesive bond between the laminated metal parts will greatly further this tendency not only for aircraft purposes, but also for any type of structures which must be light in weight, strong and durable.

Hitherto, it has been known to use resin-impregnated closed-mesh glass fibre or cotton gauze between an aluminum honeycomb core and face sheets to be adhesively united in order to improve the peel strength of such joint. However, it has been found that in cases where a reinforcement or a doubler of sheet metal must be added to the face sheets the peel strength between these metal parts is much lower than that between the core and face sheet so that occasionally it may sink below requirements, making the product unacceptable and resulting in increased production cost.

It is the general object of the invention to avoid and overcome the foregoing and other difficulties of and objections to prior art practices by increasing adhesion between the metal sheets.

The aforesaid objects of the invention and other objects which will become apparent as the description proceeds are achieved by using between the reinforcement sheets and the face sheets a layer of open mesh unimpregnated gauze, made of suitable material such as glass cotton fibers, so that when the lamination is heated under pressure the gauze will absorb precipitated moisture, resulting in a several times greater peel strength.

Figure 1:
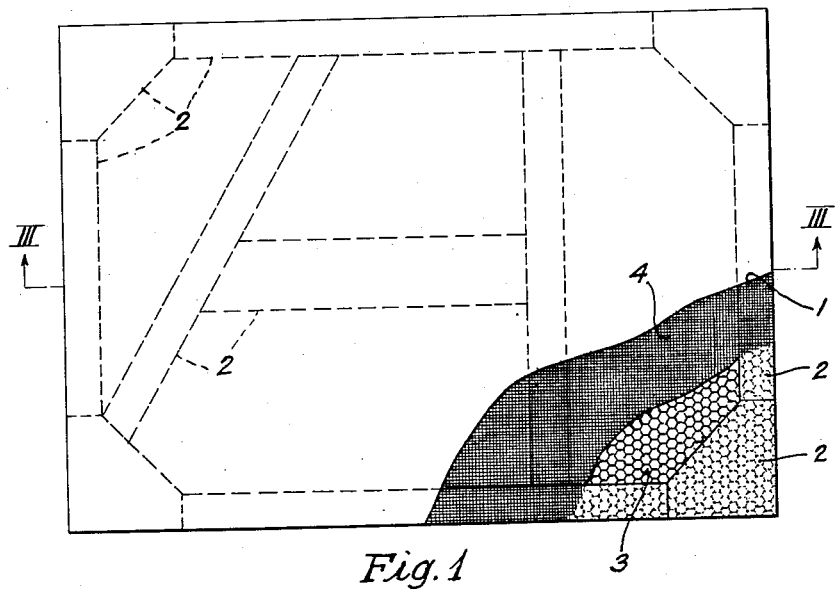
Figure 2:
Figure 3:
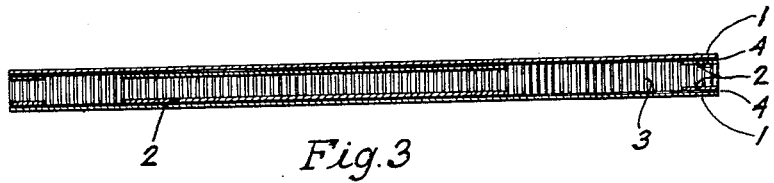
Figure 4:
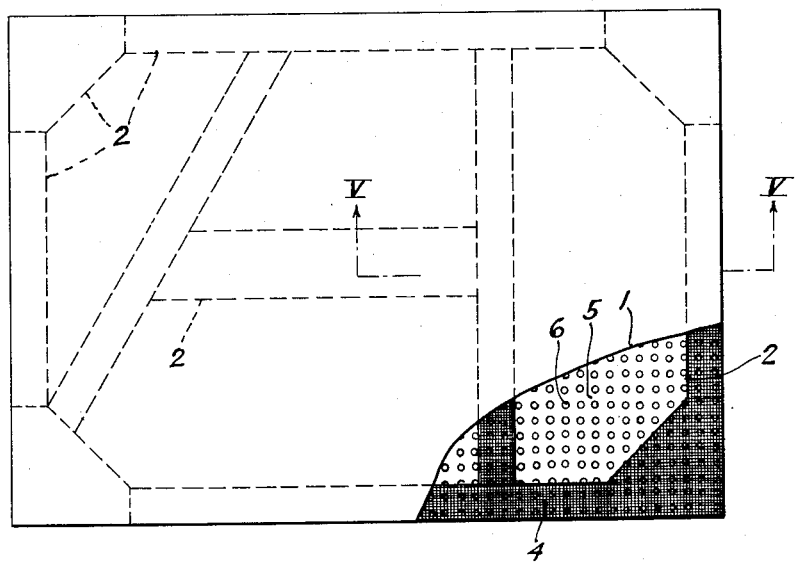
Figure 5:
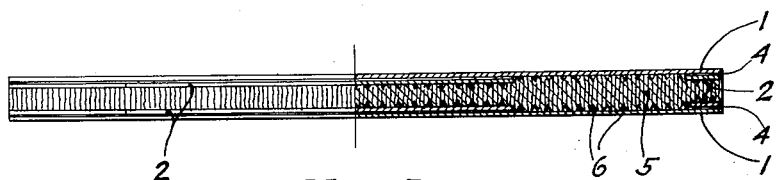

For a better understanding of the invention reference should be had to the accompanying drawing, wherein Fig. 1 is a plan view of one embodiment of the invention using a honeycomb core with top portions removed, Fig. 2 is a front view of Fig. 1, Fig. 3 is a transverse cross-sectional view taken on line III—III of Fig. 1, Fig. 4 is a plan view, with a portion of the top sheet removed, of a modified panel construction using a balsa wood core, Fig. 5 is a front view of Fig. 4, partly shown in cross-section taken on line V—V.

With specific reference to the forms of the invention illustrated in the drawings, Figs. 1 to 3, the numeral 1 indicates metal face sheets provided with local reinforcing metal sheet portions 2 between both of which and between the non-reinforced face sheet portions and the honeycomb core 3, which may be made of metal or of other material, is inserted a layer of gauze 4 having about 100 meshes per square inch, made of any suitable material, such as, glass fibres or cotton fibres. Whereas the portions of the layer of gauze between face sheet 1 and core 3 are impregnated with a thermosetting resinous adhesive forming closed meshes, the gauze portions between the metal sheets 1 and 2 are open meshed and in unimpregnated condition. Prior to assembling, the parts to be united are coated with a thermosetting resinous adhesive and then dried. With the parts assembled, pressure and heat is applied to cure the adhesive.

In Figs. 3 and 5 are shown a modification of the panel construction of the same configuration as Fig. 1 by using an end-faced balsa wood core 5, instead of the honeycomb core 3. In this case, unimpregnated open mesh gauze is put between the face sheets 1 and the reinforcing sheet portions 2. However, in order to obtain better adhesion between the balsa wood core and the metal sheet material in contact therewith, the core is advantageously provided with indentation 6 as shown and claimed in U. S. patent application, Serial No. 426,417, filed April 29, 1954, in the name of the present inventor, now abandoned. With this provision the best possible overall adhesion is obtained in the construction of a reinforced sheet metal-faced panel provided with a balsa wood core.

Since the peel strength laminated metal sheets is of greatest importance for the quality of the product the following table gives a series of comparative test values obtained on one hand by using between the metal sheets a resin-impregnated layer of gauze made of glass fibres and on the other hand a layer of unimpregnated open-mesh gauze of the same material.

*Peeling force in pounds*

| Test No. | 1 | 2 | 3 | 4 | 5 | 6 | 7 |
|---|---|---|---|---|---|---|---|
| Resin-impregnated glass fibre gauze | 13 | 7 | 10 | 15 | 6 | 3 | 14 |
| Non-impregnated glass fibre gauze | 41 | 35 | 42 | 40 | 30 | 39 | 36 |

These tests prove that the average peel strength value for the use of a resin-impregnated layer of gauze is about 10 lbs. as against about 38 lbs. for a layer non-impregnated open mesh gauze. This is a surprisingly great improvement over the prior art, probably due to the absorption of moisture, by the dry unimpregnated gauze material during the curing process.

From the above description it will be recognized that the object of the invention of greatly improving the peel strength of the adhesive joint between laminated metal sheets has been achieved.

While certain representative embodiments and details have been shown for the purpose of illustrating the invention, it will be apparent to those skilled in this art that various changes and modifications may be made therein without departing from the spirit or scope of the invention.

What is claimed:

1. That method of making a laminate which includes the steps of coating the inner face of at least one metal sheet with a thermosetting resinous adhesive, coating both sides of a metal sheet locally reinforcing the first-named metal sheet with a thermosetting resinous adhesive, coating the outer surface of a core member with a thermosetting resinous adhesive, drying the coated parts, inserting between only the metal sheets to be joined a layer of unimpregnated open-mesh gauze made of fibrous material, inserting between only the first-named metal sheet and the exposed outer surface of the core member a layer of thermosetting resin impregnated, mesh gauze of fibrous material, and applying heat and pressure to the assembly to cure the adhesive and form a laminate.

2. The method defined in claim 1 wherein both sides of the core member are provided with a metal sheet, a locally reinforcing metal sheet, and separate layers of unimpregnated and impregnated gauze in the manner and relationship recited.

References Cited in the file of this patent

UNITED STATES PATENTS

| | | |
|---|---|---|
| 1,549,320 | Lundin | Aug. 11, 1925 |
| 2,234,517 | Coffman | Mar. 11, 1941 |
| 2,415,881 | Heftler | Feb. 18, 1947 |
| 2,479,342 | Gibbons et al. | Aug. 16, 1949 |
| 2,650,185 | Larson et al. | Aug. 25, 1953 |
| 2,711,380 | Pintell | June 21, 1955 |

FOREIGN PATENTS

| | | |
|---|---|---|
| 459,980 | Great Britain | of 1937 |
| 568,187 | Great Britain | Aug. 11, 1945 |
| 577,790 | Great Britain | May 31, 1946 |